(12) United States Patent
Ishizaki et al.

(10) Patent No.: US 10,663,065 B2
(45) Date of Patent: May 26, 2020

(54) SEALING MEMBER AND SEALING STRUCTURE

(71) Applicant: SOMAR CORPORATION, Chuo-ku, Tokyo (JP)

(72) Inventors: Hirohisa Ishizaki, Tokyo (JP); Akira Ochiai, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 0 days.

(21) Appl. No.: 15/538,882

(22) PCT Filed: Dec. 22, 2015

(86) PCT No.: PCT/JP2015/085883
§ 371 (c)(1),
(2) Date: Jun. 22, 2017

(87) PCT Pub. No.: WO2016/104534
PCT Pub. Date: Jun. 30, 2016

(65) Prior Publication Data
US 2017/0356551 A1    Dec. 14, 2017

(30) Foreign Application Priority Data

Dec. 26, 2014    (JP) ................... 2014-265460

(51) Int. Cl.
*F16J 15/43*    (2006.01)
*F16J 15/14*    (2006.01)

(52) U.S. Cl.
CPC ............... *F16J 15/43* (2013.01); *F16J 15/14* (2013.01)

(58) Field of Classification Search
CPC ..................... F16J 15/43; F16J 15/14
See application file for complete search history.

(56) References Cited

U.S. PATENT DOCUMENTS

| 5,007,513 A | * | 4/1991 | Carlson ............... F16D 37/008 |
| | | | 192/21.5 |
| 5,143,637 A | | 9/1992 | Yokouchi et al. |
| 5,215,313 A | * | 6/1993 | Yokouchi ............... B82Y 30/00 |
| | | | 277/410 |

(Continued)

FOREIGN PATENT DOCUMENTS

| CN | 101100549 A | 1/2008 |
| CN | 101100549 B | 11/2010 |
| CN | 101913855 A | 12/2010 |

(Continued)

OTHER PUBLICATIONS

International Search Report of Application No. PCT/JP2015/085883 dated Mar. 8, 2016.

(Continued)

*Primary Examiner* — Gilbert Y Lee
(74) *Attorney, Agent, or Firm* — Thomas|Horstemeyer, LLP

(57) ABSTRACT

An embodiment of the present invention provides a sealing member including a magnetic powder and at least one selected from the group consisting of a rubber material and a resin material, the magnetic powder being obtained by removing a dispersion medium from a magnetic fluid including magnetic particles, a dispersant and dispersion medium.

15 Claims, 6 Drawing Sheets

(56) References Cited

U.S. PATENT DOCUMENTS

2012/0049871 A1* 3/2012 Raj ................. F16J 15/3296
324/722
2015/0362072 A1* 12/2015 Higuchi .................. C25D 5/50
277/444

FOREIGN PATENT DOCUMENTS

| JP | S61-074304 | 4/1986 |
| JP | S62-72966 | 4/1987 |
| JP | S63-166201 | 7/1988 |
| JP | H04-211104 | 8/1992 |
| JP | H10-26884 | 1/1998 |
| JP | 2003-269623 | 9/2003 |

OTHER PUBLICATIONS

Translation of Taiwanese Office Action dated Feb. 1, 2019 (1st Office Action), Taiwanese Application Number No. 104143362, pp. 1-12.
Second Notice of Examination Opinion for Chinese Patent Application No. CN201580070517.0, dated May 15, 2019.
Partial translation of Chinese Office Action dated Sep. 5, 2018 (Notification of First Examination Opinion), Chinese Application Number No. 2015800705170, pp. 1-11.
Chinese Doctoral Dissertations & Master's Thesis Full-text Database (Master) Engineering Science and Technology I (quarterly) Issue 01, 2001 Published on Dec. 16, 2003 to Mar. 15—Translation: "Preparation of Nano Fe3O4 Magnetic Powder and Magnetic Fluid, and Study of Performance Thereof", written by Wei Yong-qiang, China Outstanding Master's Thesis Full-Text Database, Engineering Science and Technology series I, 2004, First term, pp. B014 to 22.

* cited by examiner

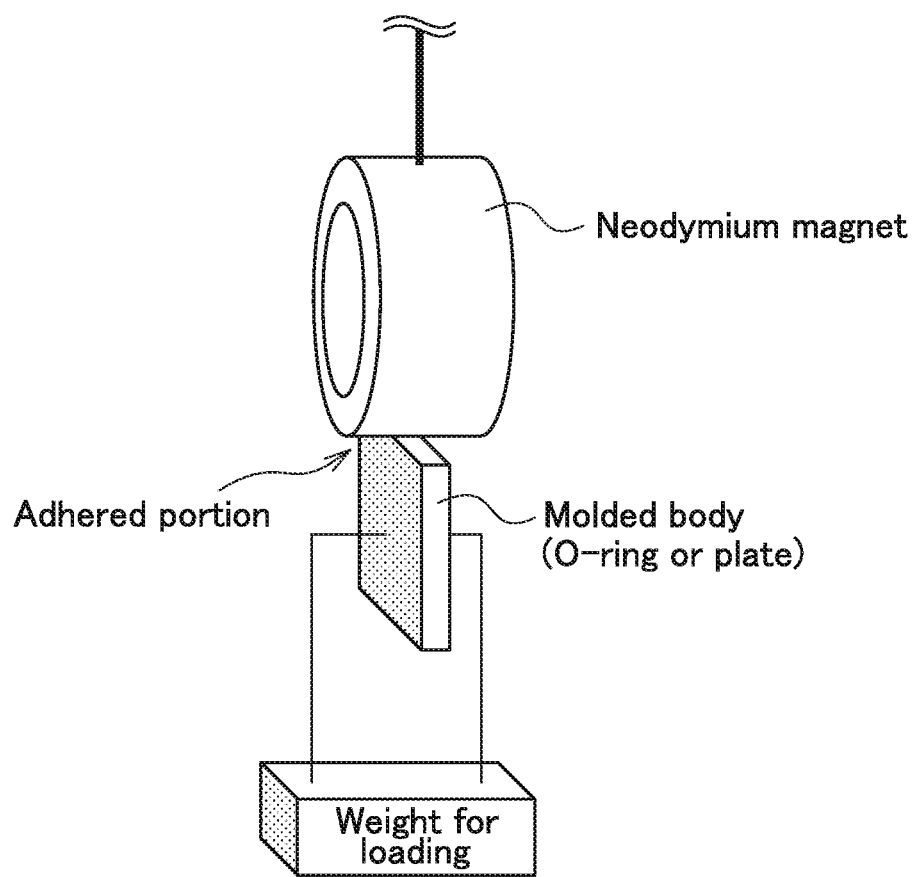

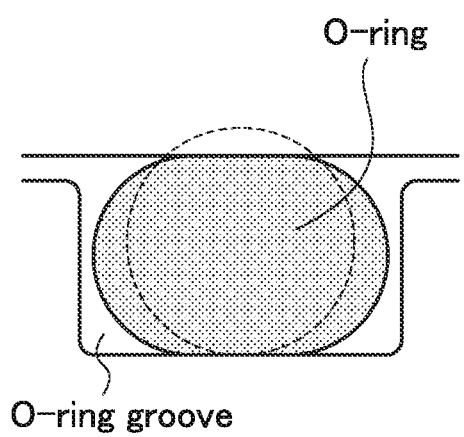

SEALING MEMBER AND SEALING STRUCTURE

CROSS-REFERENCE TO RELATED APPLICATIONS

This application is the National Stage of International Application No. PCT/JP2015/085883, filed 22 Dec. 2015, having the title "SEALING MEMBER AND SEALING STRUCTURE", which claims the benefit of and priority to Japanese Application No. 2014-265460, filed on 26 Dec. 2014, the contents of all of which are incorporated by reference as if fully set forth herein.

TECHNICAL FIELD

The present disclosure relates to a sealing member and a sealing structure.

BACKGROUND ART

Conventionally, research has been widely conducted related to techniques for sealing between members to prevent, for example, oil leakage. For example, a method of sealing using an O-ring made of rubber as shown in FIG. 7 is widely known from the viewpoints of simplicity of the structure and the like. In this method, sealing is achieved by utilizing a repelling force (contact pressure) of the O-ring, the repelling force being generated by applying pressure as appropriate to the O-ring that is mounted at a groove portion provided on the member.

However, in a case in which sealing between members is carried out using an O-ring and one of the members is a rotary shaft, the rotational resistance of the rotary shaft is increased and moreover, abrasion of the O-ring occurs easily. Therefore, there is a problem in that the sealing durability is low. This is because sealing between members is carried out by applying contact pressure between the O-ring and the rotary shaft.

Other than the sealing method using an O-ring, an oil seal is known in which a lip portion made of rubber, a metal reinforcing ring, and a spring are provided and the lip tip is pressed against a member such as a rotary shaft by the spring, thereby carrying out sealing. Since grease or the like is loaded in the oil seal, there is concern that the oil component may leak out to pollute the surroundings. Further, since sealing is carried out by utilizing the contact pressure between the lip portion made of rubber and the rotary shaft, dust is generated due to abrasion and there is a problem in that the sealing durability is low.

Further, a technique for sealing is also known in which a magnetic fluid is positioned at a gap between a rotary shaft typified by a shaft and a pole piece, such that the magnetic fluid is held by the magnetic force and the magnetic fluid thus held does not flow out, even if there is a pressure difference. Specifically, a magnetic fluid seal has been disclosed in which, in a sealing structure that seals the annular gap between a shaft member and a housing that is provided concentrically with the shaft member, between the shaft and a pole piece that is a magnetic pole member arranged in the annular gap, the gap between the internal circumferential surface of the pole piece and the outer circumferential surface of the shaft is sealed by a magnetic fluid (see, for example, Japanese Patent Application Laid-Open (JP-A) No. 2003-269623).

Moreover, a technique for sealing using a magnetic powder that is held by a magnetic force is also known. Specifically, a magnetic powder sealing method has been disclosed in which a magnetic brush of a magnetic powder is formed along the magnetic force line using magnetic particles, and, by the magnetic brush thus formed, leakage of the magnetic powder to the outside of the container is prevented (see, for example, JP-A No. H10-26884).

SUMMARY OF INVENTION

Technical Problem

As described above, regarding the sealing technique, various methods including the method using an O-ring have been conventionally proposed. However, for example, in the method using a magnetic fluid, since sealing is carried out in a liquid state, sealing with respect to rotatory motion is possible, but sealing with respect to translatory motion is difficult. Besides, a method using a magnetic fluid cannot be applied to use for sealing a liquid, and is not suitable for the use under a condition where contamination by other liquid, or aggregation or condensation of other liquid in the vicinity of the magnetic fluid may occur. Accordingly, the method has problems in, for example, causing deterioration of seal durability.

Moreover, also in the method using a magnetic powder, sealing with respect to translatory motion is difficult, and the method using a magnetic powder is not suitable for sealing a liquid and for the use under an environmental condition where contamination or condensation of other liquid may occur. Further, abrasion in the case of long-term use, namely, abrasion with respect to the member to be sealed (for example, abrasion on the surface of the rotary shaft) is not always sufficiently suppressed, and further improvement is required from the viewpoints of reducing the amount of particulate matters resulting from abrasion, preventing scratches on the seal surface, and the like.

The present disclosure has been made in view of the above circumferences, and has the object of providing a sealing member which is easy to handle, is suitable for sealing between various members, and is excellent in suppressing abrasion on the seal surface, and a sealing structure. Further, the task of the disclosure is to achieve this object.

Solution to Problem

Specific means to achieve the above object include the following embodiments.

<1> A sealing member including a magnetic powder that is obtained by removing a dispersion medium from a magnetic fluid that contains magnetic particles, a dispersant, and the dispersion medium, and at least one selected from a rubber material and a resin material.

That is, a sealing member which includes a magnetic powder that remains after removing a dispersion medium from a magnetic fluid that contains magnetic particles, a dispersant, and the dispersion medium, and at least one selected from a rubber material and a resin material.

<2> The sealing member according to <1>, wherein at least a part of the surface of the magnetic particles is covered with the dispersant, and the average primary particle diameter of the magnetic particles, at least a part of the surface of which is covered with the dispersant, is from 5 nm to 55 nm.

<3> The sealing member according to <1> or <2>, wherein the dispersant is a surfactant.

<4> The sealing member according to any one of <1> to <3>, wherein the content percentage of the magnetic powder with respect to the total amount of the magnetic powder, the rubber material, and the resin material is from 5% by mass to 50% by mass.

<5> The sealing member according to any one of <1> to <4>, wherein the rubber material is at least one of silicone rubber or acrylonitrile-butadiene rubber.

<6> A sealing structure including a magnet, a magnetic member, and at least one of the sealing member according to any one of <1> to <5>, the at least one sealing member being disposed in each of the both magnetic fields of the two magnetic poles of the magnet, between the magnet and the magnetic member.

<7> The sealing structure according to <6>, wherein the magnetic member is a shaft member having a circular cross section.

Advantageous Effects of Invention

According to the present disclosure, a sealing member which is easy to handle, is suitable for sealing between various members, and is excellent in suppressing abrasion on the seal surface, and a sealing structure may be provided.

BRIEF DESCRIPTION OF DRAWINGS

FIG. 5 is a schematic explanatory diagram that explains the testing device and method to be used in the loading test.

FIG. 7 is an explanatory diagram that explains a conventional example of sealing using an O-ring.

DESCRIPTION OF EMBODIMENTS

Hereinafter, embodiments of the sealing structure according to the present disclosure are explained in detail with reference to drawings. Further, through this explanation, the sealing member is also described in detail. However, the present disclosure is not limited to the embodiments shown below.

In the present specification, a numerical range expressed using "to" means a numerical range including the upper limit value and the lower limit value.

Figure 1:
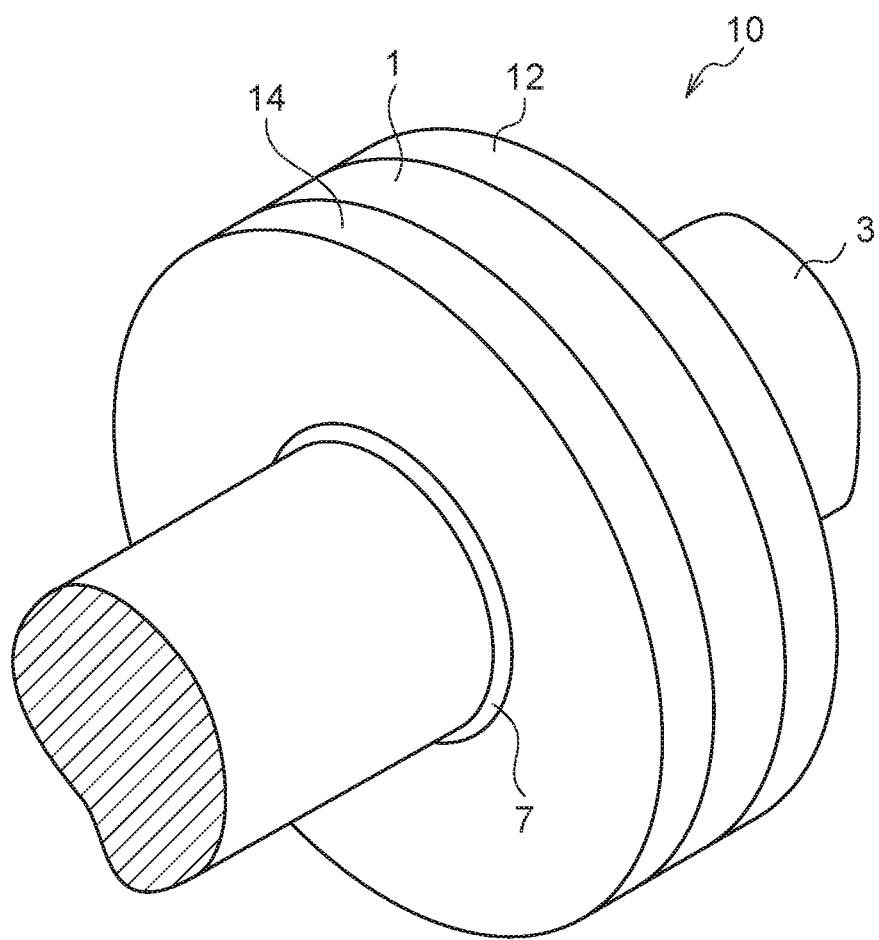
FIG. 1 is a perspective view showing a sealing structure according to an embodiment of the invention.

A sealing structure 10 according to an embodiment of the invention is shown in FIG. 1.

The sealing structure 10 includes a magnet 1, a shaft 3 which is a rotary shaft as a magnetic member and has a circular cross section, and sealing members 5 and 7, which are disposed in each of the both magnetic fields of the two magnetic poles of the magnet 1, between the magnet 1 and the shaft 3.

Figure 2:
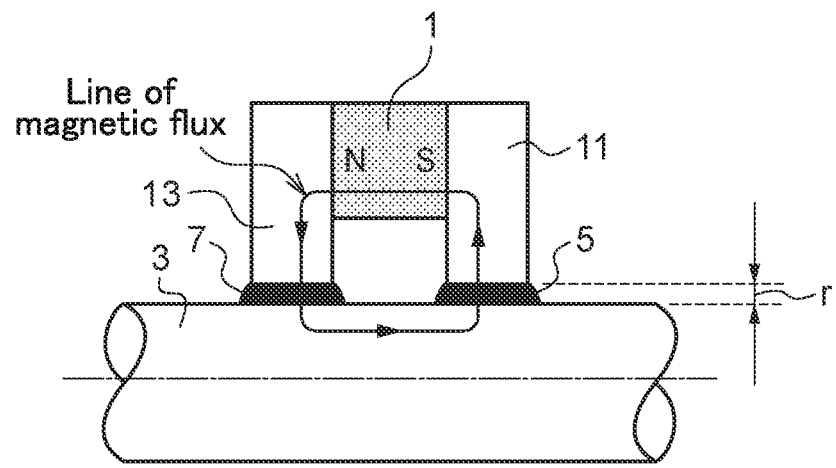
FIG. 2 is a diagram showing a cross section of a part of a sealing structure (stationary state) according to an embodiment of the invention.

In the embodiment of the invention, as shown in FIG. 2, between the magnet 1 and the shaft 3, two pole pieces 11 and 13 are disposed so as to sandwich the magnet from the two end sides of the magnet in the shaft axial direction, and sealing members 5 and 7 (see, FIG. 2 and FIG. 3) are each disposed at the end surface (namely, the internal circumferential surface) of the pole pieces 11 and 13, which faces the curved surface (namely, the outer circumferential surface) of the shaft 3.

Heretofore, various sealing techniques have been proposed. Recently, other than the sealing method using an O-ring or the oil seal, a sealing method using a magnetic fluid or a magnetic powder is utilized. However, from the viewpoints of prevention of abrasion in long-term use, sealing stability, and preventing generation of particulate matters in conjugation with abrasion, there are cases in which the sealing method cannot be applied to, for example, sealing with respect to a rotary shaft that rotates at a high speed, sealing between members having a large amount of axial eccentricity, or sealing for use in which contamination by particulate matters is problematic.

Accordingly, as shown in the embodiment of the invention, by providing a sealing member having a composition using a specific magnetic powder obtained from a magnetic fluid and a material selected from a rubber material and a resin material, between the magnet and the shaft, abrasion is not likely to occur, a stable sealing property is exhibited, and generation of particulate matters in conjugation with abrasion and contamination by particulate matters can be more effectively prevented. By having such a configuration, for example, in the case of sealing between members allowed to rotate at a high speed, abrasion decreases remarkably. Further, even in the case of a sealing structure in which sealing property deteriorates easily, an excellent sealing property can be stably ensured. For example, in the case of sealing between members in which the gap amount changes due to a large amount of axial eccentricity or the like, since the sealing member containing the magnetic powder is held at a predetermined position by being attracted to the magnetic force line, the sealing property is excellent. In the conventional oil seal, sealing effect is obtained by providing a spring in addition to a lip portion made of rubber; however, as indicated in the embodiment of the invention, by disposing a sealing member using a magnetic powder in the magnetic field, it is not necessary to provide a spring. Thus, the pressure unevenness in the seal portion in the case of using a spring is cancelled, and also a function of centering (a phenomenon in which the shaft is attracted to the magnetism to maintain a definite distance) can be imparted, so that it is possible to allow high-speed rotation while maintaining a favorable sealing property.

The magnet 1 is formed in the form of an annular body (a ring body) in which the cross section in the thickness direction that crosses at right angles to the circumferential direction is rectangle. The magnet 1, which is an annular body, has a circular hole, and the shaft 3 passes through the inside of the hole. The shaft 3 and the magnet 1 are disposed such that the internal circumferential surface of the magnet and the outer circumferential surface of the shaft face each other. The magnet 1 generates a magnetic force, and a line of magnetic flux is formed between the magnet and the shaft 3, to magnetize the shaft 3.

The pole pieces 11 and 13 are magnetic members that support the magnet 1, and are arranged along the outer circumferential surface of the shaft. Namely, as shown in, for example, FIG. 1 to FIG. 3, the pole pieces 11 and 13 are annular bodies (ring bodies) each having a hole with an inside diameter smaller than the inside diameter of the magnet. The shaft 3 also passes through the holes of the two pole pieces 11 and 13, which are annular bodies. The cross sections of the pole pieces 11 and 13 in the thickness direction that crosses at right angles to the circumferential direction are rectangle, as shown in FIG. 2.

The shaft 3 is a rod-like magnetic member having a circular cross section and is one of the two members to be sealed to each other. The shaft is magnetized by the line of magnetic flux produced by the magnet 1. The material of the shaft is not particularly limited as long as the material can be used as a magnetic member capable of being magnetized. A ferromagnetic material, for example, a metal such as iron, nickel, or cobalt, any alloy thereof (for example, a stainless steel alloy), or the like can be used.

The shape of the shaft is not limited to a rod-like shape having a circular cross section, and may be any of a rod-like shape having a polygonal cross section (for example, square, pentagon, hexagon, octagon, or the like), a rod-like shape having an oval cross section, a conical shape, a pyramid-like shape having a polygonal cross section (for example, square, pentagon, hexagon, octagon, or the like), and the like. From the viewpoint of sealing property, a rod-like shape having a cross section with relatively small irregularities is preferable, and a rod-like shape having a circular or oval cross section is preferable.

Figure 3:
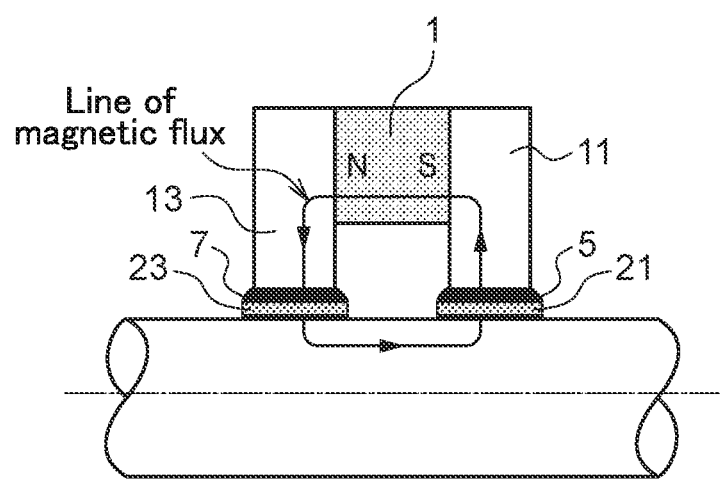
FIG. 3 is a diagram showing a cross section of a part of a sealing structure (drive state) according to an embodiment of the invention.

The sealing members 5 and 7 are disposed between the shaft 3 and each of the two pole pieces 11 and 13, respectively. As shown in FIG. 2, the internal circumferential surface of the pole pieces 11 and 13 and the outer circumferential surface of the shaft face each other. When the shaft 3 is magnetized, the sealing members 5 and 7 that seal the object to be sealed are fixed between the internal circumferential surface of the pole piece 11 and the outer circumferential surface of the shaft 3 and between the internal circumferential surface of the pole piece 13 and the outer circumferential surface of the shaft 3, respectively, by a magnetic force. Namely, in the embodiment of the invention, as shown in FIG. 2, by providing a magnet 1, pole pieces 11 and 13 that support the magnet 1, a shaft 3, and sealing members 5 and 7 which are disposed between the shaft 3 and each of the pole pieces 11 and 13, a magnetic circuit is formed as shown by the arrow. In the state in which the shaft does not rotate (stationary state), the sealing members 5 and 7 are in contact with the surface of the shaft, as shown in FIG. 2. In the state in which the shaft rotates (drive state), as shown in FIG. 3, the objects to be sealed 21 and 23 get into between the shaft 3 and each of the sealing members 5 and 7, and the sealing effect is exhibited while the object to be sealed is interposed.

Namely, when the pole pieces 11 and 13 and the shaft 3 are magnetized by the line of magnetic flux produced by the magnet 1, the objects to be sealed which have entered into the minute gaps between the shaft 3 and each of the sealing member 5 and 7 are held between the shaft 3 and each of the pole pieces 11 and 13. The gaps between the shaft 3 and each of the pole pieces 11 and 13 are sealed, through the objects to be sealed 21 and 23, by the sealing members 5 and 7 that are drawn toward the direction of the line of magnetic flux.

The sealing members 5 and 7 are formed in the form of an annular body (ring body) having a thickness (thickness r in FIG. 2) needed for sealing, and may be formed so as to match the shape of the gaps between the shaft 3 and each of the pole pieces 11 and 13.

The shape of the sealing member may be selected as appropriate according to the shape of the gap to be sealed, and may be, for example, a ring-like shape (for example, the shape of an O-ring) or a plate-like shape.

The thickness (thickness r in FIG. 2) of the sealing member in the direction of the distance between the members to be sealed (in FIG. 2, between the shaft 3 and each of the pole pieces 11 and 13) is not particularly limited. The thickness of the sealing member may be set to a thickness required according to the distance between the members to be sealed, and is generally in a range of from 10 μm to 50 mm.

The sealing members 5 and 7 may be formed to have the same composition with each other, or may be formed to have a composition different from each other, as long as the sealing property is not impaired.

In the stationary state, the shaft 3 and each of the sealing members 5 and 7 are in contact with each other and gaps are not formed between the shaft 3 and each of the sealing members 5 and 7. Whereas, in the drive state, minute gaps are formed between the shaft 3 and each of the sealing members 5 and 7. The objects to be sealed get into the gaps formed, and sealing is conducted through the objects to be sealed 21 and 23. The size of the minute gaps formed at the time of driving is not particularly limited and is determined according to the characteristics of the object to be sealed (for example, the shape or size of particles, or the like).

Examples of the object to be sealed include powder such as a toner, particles, and a liquid such as oil.

As described above, the magnet supported by the pole pieces has a function of holding each of the sealing members 5 and 7 at a predetermined position, that is, between the shaft 3 and each of the pole pieces 11 and 13. Since the sealing members are drawn by the line of magnetic flux and are fixed between the magnetized shaft and each of the pole pieces, a favorable sealing property can be maintained, even if eccentricity of the shaft, surface irregularities, or the like are present.

Further, since the line of magnetic flux extends to the sealing members through the pole pieces, if there is a case in which abrasion, breakage, or the like occurs in the sealing member, particulate matters resulting from abrasion or chips that have been produced are attracted and can be captured so as not to scatter. Accordingly, a clean condition can be maintained.

(Variations)

In the embodiment of the invention, a structure in which a magnet is supported using two pole pieces (annular bodies) having a rectangular cross section in the thickness direction that crosses at right angles to the circumferential direction is mainly explained, but the sealing structure is not limited to such a structure. It is only required that the sealing structure includes at least one sealing member disposed in each of the both magnetic fields of the two magnetic poles of the magnet, between the magnet and the shaft that is a magnetic member, and has a structure in which a magnetic circuit is formed among the magnet, the at least one sealing member, and the shaft.

Hereinafter, variations of the sealing structure are shown.

Figure 4A:
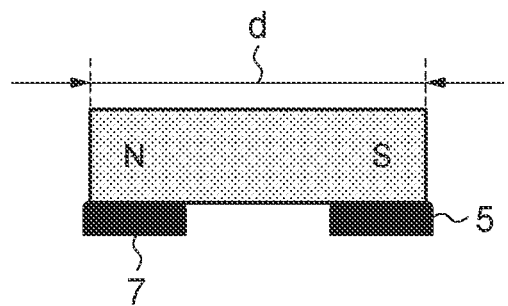
FIG. 4A illustrates a mode in which the sealing members are disposed directly on the magnet without interposing a pole piece.

A variation of the sealing structure may be a sealing structure as shown in FIG. 4A, in which the pole pieces that support the magnet are not used and a magnet that is a cylindrical annular body (for example, the cross section in the thickness direction is rectangle) having, for example, a great height d (=the distance between one surface and the other surface in an annular material), so as to match the width for arrangement of the sealing members, is disposed on the outer circumferential surface of the shaft while interposing the sealing members 5 and 7.

Figure 4B:
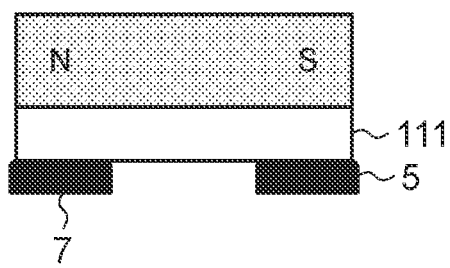
FIG. 4B illustrates a mode in which a single pole piece having the same shape as the shape of the magnet is provided.
Figure 4C:
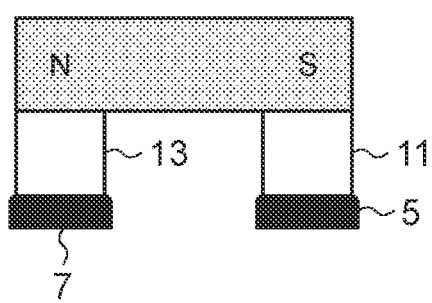
FIG. 4C illustrates a mode in which the magnet is disposed on the pole pieces.

Other variations may include a sealing structure as shown in FIG. 4B, in which a pole piece 111 having the same height d (=the distance between one surface and the other surface in an annular material) as the height of the magnet is disposed between the magnet and each of the sealing members 5 and 7; and a sealing structure as shown in FIG. 4C, in which a magnet is not sandwiched by the pole pieces but is disposed on the pole pieces, and the assembly is arranged on the outer circumferential surface of the shaft while interposing the sealing members 5 and 7.

Figure 4D:
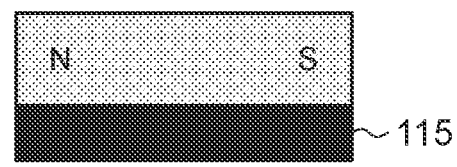
FIG. 4D illustrates a mode in which a sealing member having the same shape as the shape of the magnet is disposed directly on the magnet without interposing a pole piece.

Yet another variation may be a sealing structure as shown in FIG. 4D, in which the pole pieces that support the magnet are not used and a magnet that is a cylindrical annular body (for example, the cross section in the thickness direction is rectangle) having a great height d (=the distance between one surface and the other surface in an annular material) is disposed on the outer circumferential surface of the shaft while interposing a sealing member 115 having approximately the same height as the height of the magnet.

Here, the sealing member is explained in detail.

The sealing member according to the embodiment of the invention includes a magnetic powder that is obtained by removing a dispersion medium from a magnetic fluid that contains magnetic particles, a dispersant, and the dispersion medium, and at least one selected from a rubber material and a resin material. The sealing member may further contain other components, if necessary.

As shown in the embodiments of the invention, by having a composition using a specific magnetic powder obtained from a magnetic fluid and a material selected from a rubber material and a resin material, a stable sealing property with respect to the object to be sealed can be exhibited. Further, since abrasion is favorably suppressed, generation of particular matters in conjugation with abrasion is also prevented. Particularly, in the sealing member using a magnetic powder that is obtained from a magnetic fluid, the effect of reducing the abrasion that affects the member to be sealed is remarkably exhibited. Accordingly, even if the sealing member is used under the condition in which the sealing property is likely to deteriorate, an excellent sealing property is exhibited. Namely, for example, even if the sealing member is used between the members allowed to rotate at a high speed, abrasion is extremely suppressed. Further, in a case in which the sealing member is used between members in which the gap amount changes because of a large amount of axial eccentricity or the like, since the sealing member including the magnetic powder is attracted to the magnetic force line and held, an excellent sealing property is exhibited.

[Magnetic Powder]

The sealing member includes at least one kind of magnetic powder which is obtained by removing a dispersion medium from a magnetic fluid that contains magnetic particles, a dispersant, and the dispersion medium. The magnetic powder in the present disclosure is an aggregate of particles, which exhibits super paramagnetism and is obtained by removing a dispersion medium from a magnetic fluid.

The term "super paramagnetism" indicates that a particle, which is a ferromagnetic substance, does not exhibit hysteresis and also does not have residual magnetization, and shows a value of atomic magnetic moment of from 100-fold to 100,000-fold higher than the atomic magnetic moment of paramagnetism.

—Preparation of Magnetic Fluid—

A magnetic fluid is a colloidal solution in which magnetic particles are dispersed in a dispersion medium. Since the dispersibility thereof is excellent, solid-liquid separation such as precipitation or separation due to, for example, the gravitational force or the magnetic field does not occur, and the magnetic fluid can be regarded as a uniform liquid having its own magnetism.

The magnetic fluid to be used in the embodiment of the invention may be prepared as appropriate, or a commercially available product may be used. As the magnetic fluid, for example, a magnetic fluid containing a dispersion medium and magnetic particles, at least a part of the surface of which is covered with a dispersant, is preferable. Examples of the commercially available product of the magnetic fluid include EXP series, P series, APG series, and REN series (all trade names, manufactured by Ferrotec Corporation).

When a magnetic fluid is prepared, methods for preparing the magnetic fluid can be classified into methods of reducing the sizes of macroscopic magnetic particles into colloidal sizes, and methods of condensing atoms or ions to obtain magnetic fine particles. Examples of the former methods include a pulverization method and a spark erosion method. Examples of the latter methods include a chemical coprecipitation method (wet method), a method of thermally decomposing a metal carbonyl, and a vacuum deposition method. In the embodiment of the invention, a chemical coprecipitation method is preferable due to excellent productivity achieved thereby.

A method of preparing a magnetic fluid by using a chemical precipitation method is, for example, a method including adding sodium oleate to a magnetite water slurry prepared from a ferrous sulfate aqueous solution and a ferric sulfate aqueous solution to cause oleate ions to be adsorbed on the surface of magnetite particles, followed by washing with water, drying, and then dispersing in an organic solvent.

Next, magnetic particles, a dispersant and a dispersion medium included in the magnetic fluid in the embodiment of the invention are described in detail below.

(Magnetic Particles)

Examples of the magnetic particles include: ferromagnetic oxides such as magnetite, γ-ferric oxide, manganese ferrite, cobalt ferrite, or a composite ferrite of any of these with zinc and/or nickel, or barium ferrite; ferromagnetic metals such as iron, cobalt and rare earth elements; and metal nitrides. Among them, magnetite is preferable from the viewpoint of mass producibility.

The magnetic particles are used without particular limitations as long as the magnetic particles have an average particle size within a range in which supermagnetism can be exhibited, i.e., an average particle size that is not greater than the critical particle size. For example, in the case of magnetite or γ-ferric oxide, the average particle size is preferably 50 nm or less, and particularly preferably in the range of from 10 nm to 40 nm. The average particle size of the magnetic particles is an average primary particle size as measured by a dynamic light scattering method.

From the viewpoint of mass producibility, the content of magnetic particles contained in the magnetic fluid is preferably from 30% by mass to 70% by mass, and more preferably from 40% by mass to 60% by mass, in terms of solid content. Here, the "in terms of solid content" refers to the content of magnetic particles after calcination relative to the total mass.

(Dispersant)

The dispersant is added in order to improve the dispersibility of the magnetic particles in the dispersion medium. Known surfactants, polymeric dispersants and the like may be used, as appropriate, as the dispersant. In particular, surfactants are preferable from the viewpoints of dispersibility and the performance of the resultant magnetic powder.

Inclusion of the magnetic particles and the dispersant in the magnetic fluid causes at least a portion of the amount of the dispersant to attach to the magnetic particles, whereby at least a part of the surface of the magnetic particles is covered with a dispersant, preferably a surfactant. This enables the magnetic particles to be stably dispersed in the dispersion medium since hydrophilic groups of the surfactant are adhered toward the surface of the magnetic particles whereas hydrophobic groups thereof are oriented toward the dispersion medium. Examples of surfactants that can be used as the dispersant in the present disclosure include: anionic surfactants, which are hydrocarbon compounds having a polar group such as a carboxyl group, a hydroxyl group or a sulfonic acid group, for example, oleic acid or a salt thereof, a petroleum sulfonic acid or a salt thereof, a synthetic sulfonic acid or a salt thereof, eicosyl naphthalene sulfonic acid or a salt thereof, polybutene succinic acid or a salt thereof, and erucic acid or a salt thereof; nonionic surfactants, for example, polyoxyethylene nonyl phenyl ether; and amphoteric surfactants having both a cationic moiety and an anionic moiety in the molecular structures thereof, such as alkyl diamino ethyl glycine. Among them, sodium oleate is preferable due to its low price and easy availability.

The dispersant may be used singly, or in combination of two or more thereof. The content of dispersant (when two or more dispersants are contained, the total content thereof) in the magnetic fluid may be an amount with which aggregation between magnetic particles can be prevented, and is more preferably from 5% by mass to 25% by mass, particularly preferably from 10% by mass to 20% by mass, in terms of solid content.

In the magnetic fluid, a dispersant is adsorbed onto the magnetic particles, as a result of which at least a part of the surface of the magnetic particles is covered with a dispersant. In the embodiment of the invention, the "magnetic particles covered with a dispersant" refers to magnetic particles that are in the state in which at least a part of the surface is covered with a dispersant.

From the viewpoint of preventing aggregation between magnetic particles, it is preferable that a dispersant of about 1 nm to about 5 nm is adsorbed onto the surface of the magnetic particles, and it is more preferable that a dispersant of about 2 nm to about 3 nm is adsorbed onto the surface of the magnetic particles.

The average primary particle diameter of the magnetic particles covered with a dispersant is preferably in a range of from 5 nm to 55 nm. For example, in a case in which the magnetic particles are made of magnetite or γ-ferric oxide, it is preferable that the average primary particle diameter of the magnetic particles covered with a dispersant is equal to or greater than the average particle diameter of the magnetic particles described above. The average primary particle diameter is preferably 55 nm or less, and particularly preferably in a range of from 11 nm to 45 nm.

The average particle diameter of the magnetic particles covered with a dispersant is a value as measured by a dynamic light scattering method, using a nano particle analyzer NANO PARTICA SZ-100 series manufactured by Horiba Ltd.

Here, in the present specification, the average particle diameter of the magnetic particles refers to the average particle diameter of the magnetic particles covered with a dispersant, unless specified otherwise.

From the viewpoint of preventing aggregation between magnetic particles, the content of the dispersant (when two or more kinds are contained, the total content thereof) in the magnetic fluid is preferably from 5% by mass to 25% by mass, and more preferably from 10% by mass to 20% by mass, in terms of solid content.

(Dispersion Medium)

The dispersion medium of the magnetic fluid is not particularly limited as long as it is in the liquid state at room temperature and the magnetic particles can be dispersed therein. At least one selected from the group consisting of water, organic solvents, and the like is used as the dispersion medium.

Examples of organic solvents include: hydrocarbons having a molecular weight of not more than 5000, such as polyolefins, isoparaffin, heptane and toluene; esters such as polyol esters; and silicone oils. A mixture of plural kinds of organic solvents may be used as long as the compatibility therebetween is favorable.

Water, or a mixture of water and a water-soluble organic solvent, can preferably be used. Examples of water-soluble organic solvents include ethanol and methanol. When water is used as a dispersant, pure water or ion exchange water, in which the content of impurities is small, is preferably used.

The concentration of each component relative to the dispersion medium is not particularly limited. Nevertheless, from the viewpoint of, for example, processability in subsequent processes, the amount of the dispersion medium is preferably such that the solid matter concentration as a total of the respective components described above is in the range of from 30% by mass to 90% by mass, more preferably in the range of from 60% by mass to 80% by mass.

In the solid component included in the magnetic fluid, the ratio (inorganic components:organic components) of the total content of the magnetic particles (inorganic components) to the total content of organic components such as a dispersant typified by a surfactant is not particularly limited as long as it is within a range in which superparamagnetism is exhibited. Nevertheless, in general, the mass ratio (magnetic particles:dispersant) of the magnetic particles to the dispersant is preferably from 60:40 to 90:10, and more preferably in the range of from 70:30 to 85:15.

The ratio of the content of inorganic components to the content of organic components in the magnetic fluid can be determined by differential heat capacity measurement. The content of each component in the specification is measured using an EXSTAR6000TG/DTA manufactured by Seiko Instruments Inc.

(Other Components)

In the magnetic fluid, in addition to the magnetic particles, the dispersant and the dispersion medium, various other components may further be included in accordance with the purpose, within a range in which the effects of the embodiment of the invention are not impaired.

Examples of other components include pH controlling agents such as potassium hydroxide and triethylamine. Inclusion of a pH controlling agent enables the control of the size (primary particle diameter) of the magnetic particles.

—Removal of Dispersion Medium in Magnetic Fluid—

By removing the dispersion medium from the magnetic fluid obtained in the above manner, a solid component that includes magnetic particles of which at least a part of the surface of the particle is covered with a dispersant is obtained.

Methods employed for removing the dispersion medium are not particularly limited. Examples thereof include: a method including adding a coagulating component to the magnetic fluid, to coagulation-precipitate the magnetic particles contained in the magnetic fluid, and removing the dispersion medium, which is present as the supernatant; a method including separating the solid component by filtering using a filter or filter paper having an appropriate opening; a method including performing heating at a temperature that is equal to or higher than the boiling point of the dispersion medium, to remove the dispersion medium by evaporation; a method involving centrifugation, the method including applying a centrifugal force to the magnetic fluid, to separate the magnetic particles covered with a dispersant and contained in the magnetic fluid; and a method including performing separation using a magnet.

In this process, there are cases in which residual dispersant and the like that do not attach to the magnetic particles are also removed together with the dispersion medium.

In the embodiment of the present invention, magnetic particles covered with a dispersant are obtained using the magnetic fluid as described above. In contrast, since the magnetic powder is extremely small, it is extremely difficult to obtain a covered magnetic powder capable of exerting the effects of the invention, even when the surface of a magnetic fluid is processed to be covered with an organic material using a usual covering method, such as an electrostatic contact method or a spray method.

In particular, a method of coagulation-precipitating the magnetic particles is preferable from the viewpoints of separation efficiency and safety. This method is described in detail below.

In the present embodiment, first, a coagulating component is added to the magnetic fluid, thereby coagulation-precipitating the magnetic particles contained in the magnetic fluid. The method employed for the coagulation-precipitating is, for example, a method including adding a solvent containing an alcohol, more particularly ethanol, as a coagulating component in a case in which isoparaffin is used as an organic solvent that is the dispersion medium of the magnetic fluid. Adding a coagulating component followed by stirring causes uniformly dispersed magnetic particles to aggregate with one another, to precipitate. The ethanol may be pure ethanol, or alternatively an ethanol aqueous solution having a concentration of 80% by mass or higher.

In order to stably precipitate the magnetic particles through stirring, the duration of precipitation in the present process is preferably from about 1 hour to about 36 hours, and more preferably from about 20 hours to about 28 hours, when the temperature is room temperature (25° C.).

In this process, the precipitation of the particles is preferably performed using an organic solvent, such as an alcohol, as a coagulating component. It is preferable that co-precipitating agents or the like, which are usually used for causing efficient particle aggregation, are not used, because the co-precipitating agents or the like themselves have electric conductivity, and may influence the magnetic properties of the magnetic powder or cured product to be obtained.

—Production of Magnetic Powder—

In the process of removing the dispersion medium, it is preferable to remove the dispersion medium, and heat the solid component that contains magnetic particles covered with a dispersant and that has been separated from the dispersion medium, thereby further reducing the amount of residual solvent. In the process, if the solid component has aggregated, the solid component is re-powdered, to obtain a magnetic powder.

First, the solid component, such as a coagulation-precipitate, is further filtered, thereby separating alcohol and/or residual dispersion medium therefrom, and the resultant is heated. Since rapid heating to a high temperature may cause uneven drying of the magnetic particles and/or scattering of the magnetic particles due to rapid volume expansion of alcohol remaining between the magnetic particles. Therefore, the drying temperature is preferably in the range of from 70° C. to 200° C., and more preferably in the range of from 100° C. to 150° C. A two-stage drying process may be adopted in which initial drying is performed in the temperature range of from 60° C. to 80° C. for about 1 hour and then the temperature is increased to the temperature range of from 100° C. to 150° C.

With respect to the drying apparatus, a method including placing the solid component in a convection oven in which the temperature has been raised to a preset temperature, to dry the solid component, a method including adding the solid component into a rotary kiln, to dry the solid component, and the like are preferable. The drying time is preferably from 5 hours to 10 hours, and more preferably from about 6 hours to about 9 hours. After heating, the solid component is cooled by being left to stand, and drying is finished thereby. The cooling may be performed for a duration of from about 1 hour to about 2 hours.

The presence of residual solvent makes the surface of the magnetic particles to be tacky; therefore, drying is preferably performed to a degree at which the tackiness is no longer sensed when touched with fingers.

After drying, the stage proceeds to the process of powdering the solid component, and the solid component that has aggregated in the previous process is re-powdered. The re-powdering is performed, for example, by pulverizing the aggregated solid component, and the powder obtained by the powdering is used as the magnetic powder according to the embodiment of the invention.

In the case of performing pulverization, a silane coupling agent is preferably uniformly sprayed onto the surface of the particles after drying that is in the dry state prior to pulverizing. The silane coupling agent is adsorbed on the surface of the magnetic particles, and can improve the adhesion to the rubber material or the resin material described below.

With respect to silane coupling agents that can be used in the embodiment of the invention, known silane coupling agents that have a functional group capable of being adsorbed on the magnetic particles may be used, as appropriate.

Examples of the silane coupling agent include KBM-403 (tradename) manufactured by Shin-Etsu Chemical Co. Ltd. The silane coupling agent may be used singly, or in combination of two or more thereof. The amount of the silane coupling agent to be added is preferably from 0.5 parts by mass to 1.5 parts by mass with respect to 100 parts by mass of the dry particles.

The pulverization is preferably performed using a known pulverization apparatus that can apply a compression stress or a shear stress, such as a cutter mixer or HENSCHEL mixer. Pulverization that applies a sliding stress, such as by using a mortar or a mill, is not preferable since the magnetic properties of the magnetic powder to be obtained are affected thereby.

At least a part of the surface of the magnetic particles obtained in the manner described above is covered with an organic component, such as a dispersant originally contained in the magnetic fluid and/or an optionally added silane coupling agent.

The presence of an organic component on the surface of the magnetic particles can be confirmed by, for example, differential thermal analysis.

In the sealing member, the content percentage of the magnetic powder with respect to the total amount of the magnetic powder, and the rubber material and resin material described below is preferably in a range of from 5% by mass to 50% by mass, more preferably in a range of from 10% by mass to 40% by mass, and particularly preferably in a range of from 30% by mass to 40% by mass.

When the content percentage of the magnetic powder is 5% by mass or higher, the resulting sealing member exhibits excellent sealing property. When the content percentage of the magnetic powder is 50% by mass or lower, the magnetic powder can be easily kneaded and the resulting sealing member exhibits excellent abrasion resistance.

[Rubber Material and Resin Material]

The sealing member contains at least one selected from a rubber material and a resin material. The rubber material and the resin material function as a moldable material for use in the preparation of a molded body.

(Rubber Material)

The rubber material is not particularly limited, and may be selected in accordance with the intended use, required characteristics, and the like. Examples of the rubber material may include natural rubbers and synthetic rubbers (for example, a styrene-butadiene rubber (SBR), a butadiene rubber (BR), an isoprene rubber (IR), an ethylene-propylene rubber (EPM), an ethylene-propylene-diene rubber (EPDM), a silicone rubber, an acrylonitrile-butadiene rubber (NBR), an acryl rubber, a urethane rubber, a fluorine-containing rubber (FKM), a hydrogenated nitrile rubber, a polysulfide rubber, and the like). Among them, a silicone rubber and an acrylonitrile-butadiene rubber (NBR) are preferable, from the viewpoints of oil resistance and availability.

The silicone rubber may be a two-part reactive silicone rubber, or may be a thermosetting silicone rubber which heat-cures by using, for example, a main silicone agent (MILLABLE SILICONE TSE221-5U, TSE260-5U, or TSE261-5U (trade names); all manufactured by Momentive Performance Materials Japan LLC, or KE75S-U or KE555-U (trade names); all manufactured by Shin-Etsu Chemical Co., Ltd.) and a vulcanizing agent (MILLABLE SILICONE TC8 (trade name); manufactured by Momentive Performance Materials Japan LLC).

Examples of the acrylonitrile-butadiene rubber (NBR) may include N230SV and N239SV (all trade names, manufactured by JSR Corporation).

(Resin Material)

The resin material is not particularly limited, and may be selected as appropriate from a thermoplastic resin and a thermosetting resin, in accordance with the intended use, required characteristics, and the like. In particular, a thermosetting resin is preferable from the viewpoint of durability, considering deterioration of sealing property due to, for example, the shape and size of the gap to be sealed or the degree of eccentricity of the magnetic member such as a shaft.

Examples of the thermoplastic resin include an acrylic resin, a polyethylene resin, a polypropylene resin, a polyvinyl chloride resin, a polyvinyl acetate resin, an acrylonitrile butadiene styrene copolymer resin, and a fluororesin.

Examples of the thermosetting resin include an epoxy resin, a phenol resin, a melamine resin, a polyimide resin, a urea resin, an unsaturated polyester resin, a polyurethane resin, and a silicone resin.

Either one of the rubber material and the resin material may be used, or both of them may be used in combination. Further, each of the rubber material and the resin material may be used singly or in combination of two or more kinds thereof, in accordance with the characteristics required with respect to a sealing material.

In the sealing member, the total content of the rubber material and the resin material is preferably from 50% by mass to 95% by mass, and more preferably from 60% by mass to 70% by mass, with respect to the total amount of the sealing member. The total content of the rubber material and the resin material being 50% by mass or higher is advantageous in terms of durability of the molded body. Further, the total content of the rubber material and the resin material being 95% by mass or lower is advantageous in obtaining magnetic properties.

[Additional Components]

In addition to the components described above, the sealing member may further contain, if necessary, additional components within a range in which the effects of the embodiment of the invention are not impaired. Examples of the additional components include a crosslinking agent, inorganic particles that do not have magnetism, a curing accelerator, a mold release agent, a foaming agent, a filler, an antioxidant, a vulcanizing agent, a vulcanization accelerator, a vulcanization accelerating aid, and a processing aid.

The crosslinking agent is not particularly limited. Examples thereof include an imidazole-based crosslinking agent, a urea-based crosslinking agent, a metal salt of a higher fatty acid, and triphenylphosphine. In the case of using a crosslinking agent, the content of the crosslinking agent is preferably from 0.05% by mass to 1% by mass, and more preferably in a range of from 0.2% by mass to 0.5% by mass, with respect to the total amount of the rubber material and the resin material. The crosslinking agent may be used singly, or in combination of two or more kinds thereof.

Examples of the mold release agent include inorganic particles that do not have magnetism, such as silica particles or titanium oxide particles, and waxes such as Carnauba wax, Candellila wax, or an ester wax.

Examples of the inorganic particles that do not have magnetism include silica particles and titanium oxide particles. Silica particles having a surface area of from about 170 $m^2/g$ to about 300 $m^2/g$ are preferable. In the case of using inorganic particles that do not have magnetism, the content of the inorganic particles that do not have magnetism is preferably from 0.05% by mass to 0.5% by mass, with respect to the total amount of the rubber material and the resin material.

Further, in the case of using a wax, the content of the wax, in terms of solid content, is preferably from 0.05% by mass to 1.0% by mass, and more preferably from 0.2% by mass to 0.5% by mass, with respect to the total amount of the rubber material and the resin material. The wax may be used singly, or in combination of two or more kinds thereof.

Examples of the vulcanizing agent include a sulfur-containing compound, an organic peroxide, a phenol resin, and an oxime compound.

As the sulfur-containing compound, sulfur, sulfur chloride, sulfur dichloride, morpholine disulfide, alkylphenol disulfide, tetramethylthiuram disulfide, selenium dithiocarbamate, and the like are preferable, and sulfur, tetramethylthiuram disulfide, and the like are more preferable. Examples of the sulfur include powdery sulfur, precipitated sulfur, colloidal sulfur, insoluble sulfur, and highly dispersible sulfur. In the case of using a sulfur-containing compound, generally, the content of the sulfur-containing compound is preferably from 0.1% by mass to 10% by mass, with respect to the total amount of the rubber material and the resin material. When the content is within the above range, the resulting crosslinked substance exhibits excellent mechanical properties, which is thus preferable.

The vulcanizing agent may be used singly or in combination of two or more kinds thereof.

In the case of using a sulfur-containing compound as the vulcanizing agent described above, it is preferable to further use a vulcanization accelerator.

Examples of the vulcanization accelerator include those ordinarily used for vulcanizing rubber, such as a sulfenamide-based vulcanization accelerator, a thiuram-based vulcanization accelerator, a thiazole-based vulcanization accelerator, a thiourea-based vulcanization accelerator, a guanidine-based vulcanization accelerator, or a dithiocarbamate-based vulcanization accelerator. The vulcanization accelerator may be used singly, or in combination of two or more kinds thereof.

Examples of the vulcanization accelerating aid include zinc white (zinc oxide) and stearic acid. The vulcanization accelerating aid may be used singly, or in combination of two or more kinds thereof.

The sealing member may be used as a molded body which is formed, for example, into a shape that matches the shape of the gap to be sealed. In this case, the molding method is not particularly limited, and examples thereof include press molding, injection molding, extrusion molding, cast molding, compression molding, and dip molding. The molded body obtained by such a method has excellent super paramagnetism.

It is preferable that the molded body is further subjected to a baking treatment. By baking, the hardness of the molded body can be made higher. The baking treatment can be performed using a heating device such as a convection oven.

The baking condition can be selected as appropriate in accordance with the composition of the sealing member, the shape of the molded body, or the like. The baking temperature may be set to be within a range of from 100° C. to 300° C. The baking time differs depending on the baking temperature, but may be set to be within a range of from 1 hour to 3 hours.

The sealing structure according to the embodiment of the invention can also be formed by further providing other member, if necessary.

EXAMPLES

Hereinafter, embodiments of the present invention are specifically described with reference to Examples. However, the embodiments of the present invention are by no means limited to the following Examples unless they are beyond the spirit of the invention. Unless otherwise specifically stated, "%" and "parts" are based on mass.

Example 1

1. Removal of Dispersion Medium from Magnetic Fluid 50 mL of a magnetic fluid (trade name: EXP.12038, manufactured by Ferrotec Corporation; magnetic particles covered with a dispersant (magnetic particles: magnetite, average primary particle diameter: 15 nm, dispersant: sodium oleate), dispersion medium: isoparaffin) were prepared, and 50 mL of ethanol (85% aqueous solution) were added thereto. The resulting mixture was stirred thoroughly, thereby aggregation-precipitating magnetic particles. The precipitation time was set to 24 hours. Thereafter, ethanol was removed by filtration, to obtain an aggregated precipitate of magnetic particles.

2. Production of Magnetic Powder

The aggregated precipitate thus obtained was flattened, and placed in a convection oven having a temperature elevated to 115° C. The aggregated precipitate was dried by heating in the convection oven for 8 hours, and then left to stand to cool for 2 hours. The magnetic particles after drying were subjected to a differential thermal analysis, as a result of which the magnetic particles were found to include 82% of inorganic component and 18% of organic component. From this result, it was confirmed that an organic component (surfactant) originating from the magnetic fluid was present on at least a part of the surface of the magnetic particles.

Thereafter, the powder aggregate was pulverized into a fine powder using a mixer, to obtain a magnetic powder.

The average primary particle diameter of the pulverized magnetic powder was 26 nm. Here, for the measurement of average primary particle diameter, a HELOS PARTICAL SIZE ANALYSIS WINDOXS (trade name, manufactured by Sympatec GmbH) was used.

3. Production of Magnetic Powder Composition

A main silicone agent (trade name: MILLABLE SILICONE TSE221-5U, manufactured by Momentive Performance Materials Japan LLC) and a vulcanizing agent (trade name: MILLABLE SILICONE TCB, manufactured by Momentive Performance Materials Japan LLC) were kneaded using a kneading device (two roll, manufactured by TOYO SEKI SEISAKU-SHO, LTD.) under the conditions described below. At the moment the kneaded product got transparent, the above magnetic powder was added thereto at a ratio shown in Table 1 below, followed by kneading. In this way, magnetic powder compositions (Samples 2 to 4) were obtained. Further, Sample 1 that does not contain a magnetic powder was produced as a sample for comparison.

<Kneading Conditions>

Mixing ratio; main silicone agent:vulcanizing agent=100 parts by mass:0.5 parts by mass Kneading temperature: 40° C.

Rotation speed: constant speed rotation (based on the apparatus)

Kneading time: 30 min

TABLE 1

| Sample Number | Content of Magnetic Powder *[1] [% by mass] | Occurrence of Molded Body (O-ring) | Notes |
| --- | --- | --- | --- |
| 2 | 10 | A | Present Invention |
| 3 | 30 | A | Present Invention |
| 4 | 40 | A | Present Invention |

*[1]: A mass content ratio of magnetic powder with respect to a total mass of magnetic powder, a rubber material and a resin material.

4. Production of Molded Body

Using the magnetic powder compositions obtained as described above, O-rings and plates having a central hole described below were prepared by press molding. Press molding was performed under the heating conditions described below. Thereafter, the molded bodies obtained by press molding were baked under the baking conditions described below.

<a. Kind of Molded Bodies>

O-ring: two per one sample [dimensions: outside diameter ϕ22.5 mm, inside diameter (hole diameter) ϕ12 mm, height 4 mm]

Plate having a central hole: one per one sample [dimensions: outside diameter ϕ about 115 mm, inside diameter (central hole diameter) ϕ10 mm, thickness 2 mm]

<b. Heating Conditions>

Pressing force: 30 t
Pressing temperature: 170° C.
Pressing time: 10 min

<c. Baking Conditions>

Device: convection oven
Baking temperature: 200° C.
Baking time: 2 hours

5. Evaluation

With regard to the molded bodies thus obtained, the following evaluations were carried out. Note that, Sample 1 does not contain a magnetic powder. The evaluation results are shown in Table 1 to Table 4.

(5-1) Appearance

The obtained molded body was visually observed, and evaluation was performed according to the following evaluation criteria. The evaluation results are shown in Table 1 above.

<Evaluation Criteria>

A: Occurrence of powder floating is not seen and the molded body is excellent in appearance.
B: Powder floating is slightly observed, but the appearance is not adversely affected.
C: Powder floating is remarkably observed, and the appearance is impaired.

(5-2) Loading Test

As shown in FIG. 5, the obtained O-ring was adhered to a suspended neodymium magnet, and a load was applied while changing the kind of the weight. The load bearing ability until the O-ring cannot withstand the weight and falls was measured. The evaluation results are shown in Table 2 below.

<Conditions>

Device: see FIG. 5
Neodymium magnet: dimension: outside diameter φ15 mm, inside diameter (hole diameter) φ4.3 mm, height 5 mm; magnetic force: 451 mT

TABLE 2

| Sample Number | Content of Magnetic Powder *1 [% by mass] | Weight of O-ring [g] | Load Bearing Ability [g] | Notes |
|---|---|---|---|---|
| 1 | 0 | 1.28 | NG | Comparative |
| 2 | 10 | 1.38 | 3.8 | Present Invention |
| 3 | 30 | 1.66 | 16.55 | Present Invention |
| 4 | 40 | 1.83 | 28.69 | Present Invention |

*1: A mass content ratio of magnetic powder with respect to a total mass of magnetic powder, a rubber material and a resin material.

(5-3) Water Leakage Test

Figure 6:
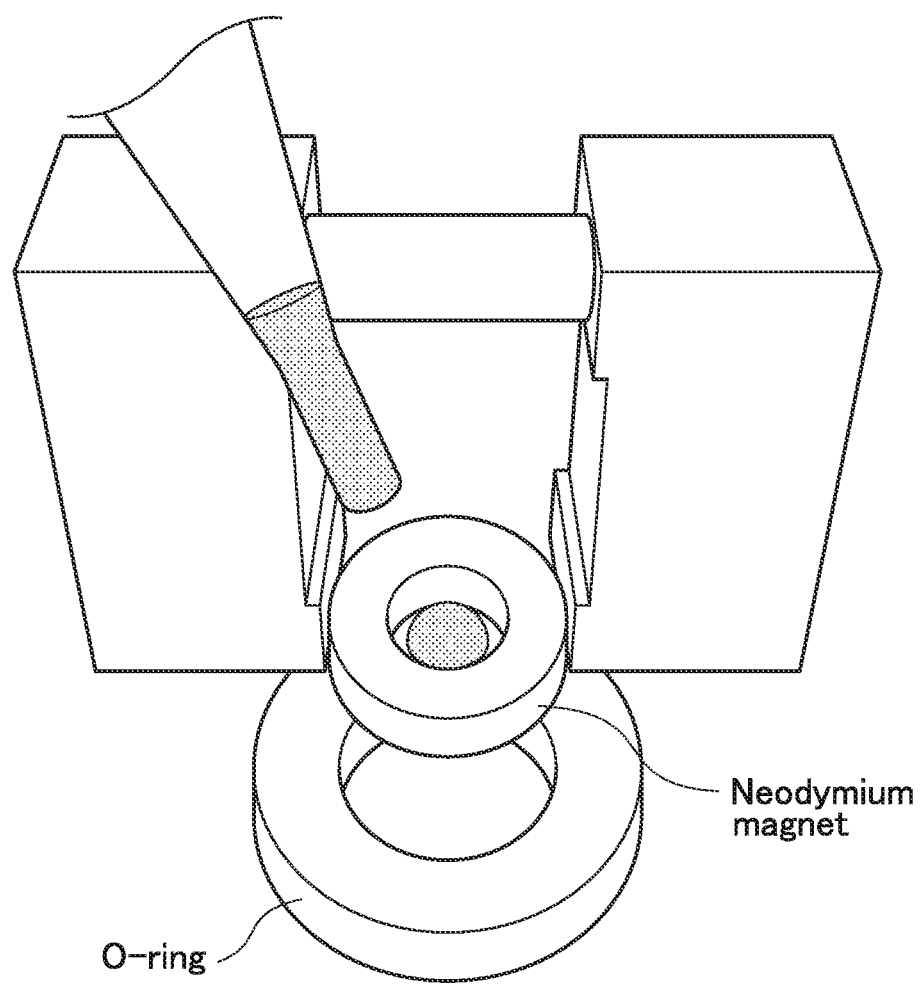
FIG. 6 is a schematic explanatory diagram that explains the testing device and method to be used in the water leakage test.

As shown in FIG. 6, a neodymium magnet was fixed in a clamp, and the edge face (plane portion) in the height direction of the O-ring was adhered onto one surface of the neodymium magnet. 0.3 g of water were added dropwise into the hole of the neodymium magnet, followed by allowing to stand for 5 minutes. Evaluation was performed by visual observation with respect to whether or not water leakage from the contact face between the magnet and the O-ring is present. The presence or absence of water leakage is used as an index for evaluating sealing property. The evaluation results are shown in Table 3 below.

Here, the "height of the O-ring" indicates the distance between the front face and rear face of the O-shaped substance.

<Conditions>

Device: see FIG. 6
Neodymium magnet: dimension: outside diameter ϕ15 mm, inside diameter (hole diameter) ϕ4.3 mm, height 5 mm; magnetic force: 451 mT

TABLE 3

| Sample Number | Content of Magnetic Powder *1 [% by mass] | Water Leakage | Notes | Notes |
|---|---|---|---|---|
| 1 | 0 | Present | Not adhered onto the magnet, and no sealing property based on the magnetic attraction | Comparative |
| 2 | 10 | Absent | — | Present Invention |
| 3 | 30 | Absent | — | Present Invention |
| 4 | 40 | Absent | — | Present Invention |

*1: A mass content ratio of magnetic powder with respect to a total mass of magnetic powder, a rubber material and a resin material.

(5-4) Abrasion Test

With regard to the plate with a central hole obtained as described above, an abrasion test was performed using a TABER TYPE TESTER AB-101 (trade name, manufactured by TABER INDUSTRIES) under the conditions described below, and the abrasion resistance of the molded body was evaluated. This test was performed in accordance with HS K6264-2 (2005). The evaluation results are shown in Table 4 below.

<Conditions>

Grinding wheel: H18
Load: 250 g
Rotation speed: 60 rpm
Number of revolutions: 1000

TABLE 4

| Sample Number | Content of Magnetic Powder *1 [% by mass] | Weight before the test [g] | Weight after the test [g] | Abrasion percentage [%] | Notes |
|---|---|---|---|---|---|
| 1 | 0 | 23.17 | 23.11 | 0.26 | Comparative |
| 2 | 10 | 25.99 | 25.87 | 0.46 | Present Invention |
| 3 | 30 | 29.9 | 29.88 | 0.07 | Present Invention |
| 4 | 40 | 33.63 | 33.57 | 0.18 | Present Invention |

*1: A mass content ratio of magnetic powder with respect to a total mass of magnetic powder, a rubber material and a resin material.

From the results shown in Table 2 to Table 4, it is revealed that, in spite of containing a magnetic powder, Samples 2 to 4, which showed excellent sealing property in the loading test and water leakage test described above, exhibited an abrasion percentage equal to or lower than the abrasion percentage of Sample 1 which does not contain a magnetic powder. Accordingly, it is obvious that, in the case of using a silicone rubber as the rubber material, the sealing member according to the embodiment of the invention is capable of exhibiting excellent sealing property while drastically suppressing abrasion and the generation of particulate matters in conjugation with abrasion.

Further, from the results described above, it is preferable that the content percentage of the magnetic powder is in a range of from 10% by mass to 40% by mass.

Example 2

1. Production of Magnetic Powder

From a magnetic fluid (trade name: EXP.12038, manufactured by Ferrotec Corporation; magnetic particles covered with a dispersant (magnetic particles: magnetite, average primary particle diameter: 15 nm, dispersant: sodium oleate), dispersion medium: isoparaffin), the dispersion medium was removed according to the same method as in Example 1, to obtain an aggregated precipitate of magnetic particles. Then, using the aggregated precipitate thus obtained, a magnetic powder was prepared. The average primary particle diameter of the magnetic powder obtained by pulverization was 26 nm.

2. Production of Magnetic Powder Composition

An acrylonitrile-butadiene rubber (NBR; trade name: N230SV, manufactured by JSR Corporation) as a main agent, a vulcanizing agent (powdery sulfur), N-(tert-butyl)-2-benzothiazolesulfenamide (TBBS; vulcanization accelerator), zinc oxide (vulcanization accelerating aid), stearic acid (processing aid), and magnetic particles (the magnetic powder described above) were mixed at a proportion (mass ratio) shown in Table 5 below. The resulting mixture was kneaded using a kneading device (two roll, manufactured by TOYO SEKI SEISAKU-SHO, LTD.) under the conditions described below. In this way, three kinds of magnetic powder compositions (Samples a and b, and Comparative Sample) were obtained.

<Kneading Conditions>

Testing machine: electric heating type hot roll, manufactured by IKEDA KIKAI KOGYO Co., Ltd.

Roll size: φ6 inch×16 inch

Rotation speed of front roll: 25 rpm

Speed ratio of front roll to rear roll: front roll:rear roll=1:1.22

Roll temperature of front and rear rolls: 50° C.±5° C.

3. Production of Molded Body

Using the magnetic powder compositions (Samples a and b, and Comparative Sample) obtained as described above, O-rings and plates having a central hole described below were prepared by press molding. Press molding was performed under the heating conditions described below.

Here, the pressing time was taken as the time needed for the degree of vulcanization to be 90%, by the method according to JIS K6300-2: 2001. Therefore, regarding Sample a, the pressing time was 32 minutes; regarding Sample b, the pressing time was 38 minutes; and regarding Comparative Sample, the pressing time was 30 minutes.

<a. Kind of Molded Bodies>

O-ring [outside diameter φ22.5 mm, inside diameter (hole diameter) φ12 mm, height 4 mm]

Plate having a central hole [outside diameter φ about 115 mm, inside diameter (central hole diameter) φ10 mm, thickness 2 mm]

<b. Heating Conditions>

Pressing force: 30 t

Pressing temperature: 150° C.

Pressing time: the time described above

4. Evaluation

With regard to the obtained molded bodies, the loading test, the water leakage test, and the abrasion test were performed and evaluations were carried out, in the same manner as in Example 1. Note that, Comparative Sample does not contain a magnetic powder. The evaluation results are shown in Table 6 to Table 8.

TABLE 6

(Loading Test)

| | Content of Magnetic Powder *1 [% by mass] | Weight of O-ring [g] | Load Bearing Ability [g] | Notes |
|---|---|---|---|---|
| Comparative Sample | 0 | 1.27 | NG | Comparative |
| Sample a | 10 | 1.31 | 4.34 | Present Invention |
| Sample b | 40 | 1.77 | 29.32 | Present Invention |

*1: A mass content ratio of magnetic powder with respect to a total mass of magnetic powder, a rubber material and a resin material.

TABLE 5

| | | Comparative Sample [Comparative] | Sample a (Content of magnetic materials: 10% by mass) [Present Invention] | Sample b (Content of magnetic materials: 40% by mass) [Present Invention] |
|---|---|---|---|---|
| NBR (Acrylonitrile-butadiene rubber) | Main agent | 100 | 100 | 100 |
| Powdery Sulfur | Crosslinking agent | 1.5 | 1.5 | 1.5 |
| TBBS (N-(tert-butyl)-2-benzothiazole-sulfenamide) | Vulcanization accelerator | 0.7 | 0.7 | 0.7 |
| ZnO | Vulcanization accelerating aid | 3 | 3 | 3 |
| Stearic Acid | Processing aid | 1 | 1 | 1 |
| EXP12038 | Magnetic materials | — | 11.8 | 70.6 |

(Unit: Parts by mass)

TABLE 7

(Water Leakage Test)

| | Content of Magnetic Powder *1 [% by mass] | Water Leakage | Notes | Notes |
|---|---|---|---|---|
| Comparative Sample | 0 | Present | Not adhered onto the magnet, and no sealing property based on the magnetic attraction | Comparative |
| Sample a | 10 | Absent | — | Present Invention |
| Sample b | 40 | Absent | — | Present Invention |

*1: A mass content ratio of magnetic powder with respect to a total mass of magnetic powder, a rubber material and a resin material.

TABLE 8

(Abrasion Test)

| | Content of Magnetic Powder *1 [% by mass] | Weight before the test [g] | Weight after the test [g] | Abrasion percentage [%] | Notes |
|---|---|---|---|---|---|
| Comparative Sample | 0 | 45.32 | 45.30 | 0.05 | Comparative |
| Sample a | 10 | 50.09 | 50.06 | 0.05 | Present Invention |
| Sample b | 40 | 61.64 | 61.51 | 0.22 | Present Invention |

*1: A mass content ratio of magnetic powder with respect to a total mass of magnetic powder, a rubber material and a resin material.

From the results shown in Table 6 to Table 8, it is revealed that, in spite of containing a magnetic powder, Samples a and b, which showed excellent sealing property in the loading test and the water leakage test, exhibited an abrasion percentage equal to or lower than the abrasion percentage of Comparative Sample which does not contain a magnetic powder. From the results described above, it is preferable that the content percentage of the magnetic powder is in a range of from 10% by mass to 40% by mass.

It is obvious that, in the case of using an acrylonitrile-butadiene rubber as the rubber material, the sealing member according to the embodiment of the invention is capable of exhibiting excellent sealing property while drastically suppressing abrasion and the generation of particulate matters in conjugation with abrasion.

INDUSTRIAL APPLICABILITY

A sealing member according to the present disclosure can be applied in place of an O-ring or the like, in the field in which sealing is conventionally carried out using, for example, an O-ring or a magnetic fluid. In particular, the sealing member according to the present disclosure is preferably used in the field in which generation of particulate matters in conjugation with abrasion is problematic. Further, the sealing member according to the present disclosure is preferably used in the field in which not only sealing with respect to rotatory motion, but also sealing with respect to translatory motion is required, the field of sealing a powder typified by a toner, the field of sealing a liquid typified by an oil seal, the field in which contamination by other liquid or contamination by a liquid due to aggregation or condensation is likely to occur, or the like.

The disclosure of Japanese Patent Application No. 2014-265460 is incorporated by reference herein in its entirety.

All publications, patent applications, and technical standards mentioned in this specification are herein incorporated by reference to the same extent as if such individual publication, patent application, or technical standard was specifically and individually indicated to be incorporated by reference.

What is claimed is:

1. A sealing member compositionally comprising:
a magnetic powder that is obtained by removing a dispersion medium from a magnetic fluid, the magnetic fluid comprising:
magnetic particles;
a dispersant; and
the dispersion medium,
the sealing member being superparamagnetic further comprising at least one material selected from the group consisting of a rubber material and a resin material, wherein the magnetic powder is kneaded into the at least one material selected from the group consisting of a rubber material and a resin material.

2. The sealing member according to claim 1, wherein at least a part of a surface of the magnetic particles is covered with the dispersant, and an average primary particle diameter of the magnetic particles covered with the dispersant is from 5 nm to 55 nm.

3. The sealing member according to claim 2, wherein the dispersant is a surfactant, and a content of the magnetic powder with respect to a total amount of the magnetic powder, the rubber material and the resin material, is from 5% by mass to 50% by mass.

4. The sealing member according to claim 3, wherein the rubber material is at least one rubber material selected from the group consisting of silicone rubber and acrylonitrile-butadiene rubber.

5. A sealing structure comprising:
a magnet;
a magnetic member; and
at least one of the sealing member according to claim 4, the at least one sealing member being disposed in each magnetic field of two magnetic poles of the magnet, between the magnet and the magnetic member.

6. The sealing structure according to claim 5, wherein the magnetic member is a shaft member having a circular cross section.

7. The sealing member according to claim 2, wherein the rubber material is at least one rubber material selected from the group consisting of silicone rubber and acrylonitrile-butadiene rubber.

8. A sealing structure comprising:
a magnet;
a magnetic member; and
at least one of the sealing member according to claim 7, the at least one sealing member being disposed in each magnetic field of two magnetic poles of the magnet, between the magnet and the magnetic member.

9. The sealing structure according to claim 8, wherein the magnetic member is a shaft member having a circular cross section.

10. The sealing member according to claim 1, wherein the dispersant is a surfactant.

11. The sealing member according to claim 1, wherein a content of the magnetic powder with respect to a total amount of the magnetic powder, the rubber material and the resin material, is from 5% by mass to 50% by mass.

12. The sealing member according to claim 1, wherein the rubber material is at least one rubber material selected from the group consisting of silicone rubber and acrylonitrile-butadiene rubber.

13. A sealing structure comprising:
a magnet;
a magnetic member; and
at least one of the sealing member according to claim 1, the at least one sealing member being disposed in each magnetic field of two magnetic poles of the magnet, between the magnet and the magnetic member.

14. The sealing structure according to claim 13, wherein the magnetic member is a shaft member having a circular cross section.

15. The sealing member according to claim 1, wherein at least a part of a surface of the magnetic particles is covered with the dispersant, and an average primary particle diameter of the magnetic particles covered with the dispersant is from 5 nm to 45 nm.

* * * * *